United States Patent
Volz et al.

(10) Patent No.: US 8,214,965 B2
(45) Date of Patent: Jul. 10, 2012

(54) WINDSCREEN WIPER DEVICE

(75) Inventors: Heiko Volz, Karlsruhe (DE); Juergen Rapp, Lauf (DE); Thomas Steimel, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 1009 days.

(21) Appl. No.: 12/064,080

(22) PCT Filed: Jul. 31, 2006

(86) PCT No.: PCT/EP2006/064826
§ 371 (c)(1),
(2), (4) Date: Feb. 19, 2008

(87) PCT Pub. No.: WO2007/023063
PCT Pub. Date: Mar. 1, 2007

(65) Prior Publication Data
US 2008/0230299 A1 Sep. 25, 2008

(30) Foreign Application Priority Data

Aug. 23, 2005 (DE) .......................... 10 2005 039 763

(51) Int. Cl.
*B60S 1/06* (2006.01)
(52) U.S. Cl. ................. 15/250.31; 15/250.3; 296/96.17; 403/DIG. 3; 248/900
(58) Field of Classification Search .................. 15/250.3, 15/250.31; 403/DIG. 3; 248/900, 205.1, 248/214; 296/96.15, 96.17
See application file for complete search history.

(56) References Cited

U.S. PATENT DOCUMENTS

| 2,208,532 | A | * | 7/1940 | Woodward | .................... | 411/187 |
| 2,649,136 | A | * | 8/1953 | Eames | .......................... | 297/295 |
| 4,676,473 | A | * | 6/1987 | Giles | ............................ | 248/638 |
| 6,216,309 | B1 | | 4/2001 | Goto et al. | | |
| 6,532,616 | B1 | | 3/2003 | Eustache | | |
| 2003/0042750 | A1 | * | 3/2003 | Muehlpforte et al. | ..... | 296/96.15 |
| 2007/0011839 | A1 | * | 1/2007 | Princet et al. | .............. | 15/250.31 |

FOREIGN PATENT DOCUMENTS

| DE | 10048253 A1 | | 4/2002 |
| EP | 1033295 | * | 9/2000 |
| WO | 03/097419 A1 | | 11/2003 |
| WO | 03/099620 A1 | | 12/2003 |
| WO | 2005/000641 A1 | | 1/2005 |

OTHER PUBLICATIONS

PCT/EP2006/064826 International Search Report.

* cited by examiner

*Primary Examiner* — Gary Graham
(74) *Attorney, Agent, or Firm* — Michael Best & Friedrich LLP

(57) ABSTRACT

The invention relates to a windscreen wiper device (10), in particular for a motor vehicle, screwed to a chassis (12). Conventional windscreen wiper devices do not yield on an impact with a pedestrian and hence represent a significant injury risk for pedestrians. According to the invention, the risk of injury may be reduced whereby the housing openings (30), provided for housing screws (11) in the chassis (12) comprise a slot (31) at the edge of the housing opening (30).

22 Claims, 3 Drawing Sheets

WINDSCREEN WIPER DEVICE

BACKGROUND OF THE INVENTION

The invention relates to a windscreen wiper device, in particular for a motor vehicle, which is screwed to a chassis.

The windscreen wiper devices known in the art do not yield on an impact with a pedestrian and therefore present a high risk of injury to pedestrians. Protruding wiper bearings, in particular, entail a high risk of injury for pedestrians. Windscreen wiper devices of this type do not meet the stringent requirements placed on pedestrian impact protection.

SUMMARY OF THE INVENTION

The object of the invention is to improve a windscreen wiper device of the type mentioned at the outset so as in the future to reduce the risk of injury for pedestrians in the event of impact on the windscreen wiper device.

The invention achieves the object set by a windscreen wiper device of the type mentioned at the outset in which, according to the invention, receiving openings, which are provided to receive the screws in the chassis, have a slot at the edge of the receiving openings. If a pedestrian strikes the windscreen wiper device, the screws are pressed out of the receiving openings along the slot. The windscreen wiper device as a whole is thus able to yield on the impact of the pedestrian, reducing the risk of injury to the pedestrian.

In order to enable the windscreen wiper device optimally to be pressed out of the receiving openings even in the event of minimal impact forces, the slots can extend parallel to a wiper shaft. In this case, the slots extend parallel to the direction in which the impact forces act.

Expediently, the slots will be configured in such a way that they reliably connect the windscreen wiper device to the chassis, even if the vehicle drives through potholes; however, on the other hand, they will ensure when the pedestrian strikes the windscreen wiper device that the screws are pressed rapidly and reliably out of the receiving openings. Therefore, the width of the slots can be at most as great as the diameters of the screws.

For the same reason, it is beneficial if the slots have a bottleneck in the region of transition to the receiving openings. Accordingly, in the event of a collision with a pedestrian, the screws have first to pass through the bottleneck before they can leave the receiving openings. The bottleneck, which may be at most as wide as the diameter of the screws, therefore ensures that the screws remain reliably in the receiving openings even in the event of shocks during travel.

In a preferred embodiment, the slots may be V-shaped in their configuration. In this embodiment, the distance between the edges of the slots after the bottleneck constantly increases so, after leaving the bottleneck, the screws no longer have to overcome any frictional forces and the windscreen wiper device is thus able rapidly to yield on the impact of the pedestrian.

The screws can be inserted through a rubber element, so the rubber element rests in the receiving openings. The rubber element thus helps to muffle noise.

A force of detachment, with which the screws are pressed out of the receiving openings, can be individually adjusted to a specific value. The individual force of detachment can, for example, be determined by the tightening torque of the screws. Furthermore, the thickness of the body sheet can also influence the force of detachment by way of the frictional forces. However, it is also possible for the receiving openings to define a specific force of detachment as a result of their geometry at the bottleneck.

In order to facilitate fitting of the windscreen wiper device to the chassis, a nut can be fastened to the rubber element. The nut can be fastened to the rubber element, for example, by vulcanizing, bonding, encapsulating the nut or the like.

Expediently, receiving openings for receiving the screws can also be provided on the windscreen wiper device.

BRIEF DESCRIPTION OF THE DRAWINGS

An exemplary embodiment of the windscreen wiper device according to the invention will be described hereinafter with reference to the appended drawings, in which specifically.

DETAILED SUMMARY

Figure 1:
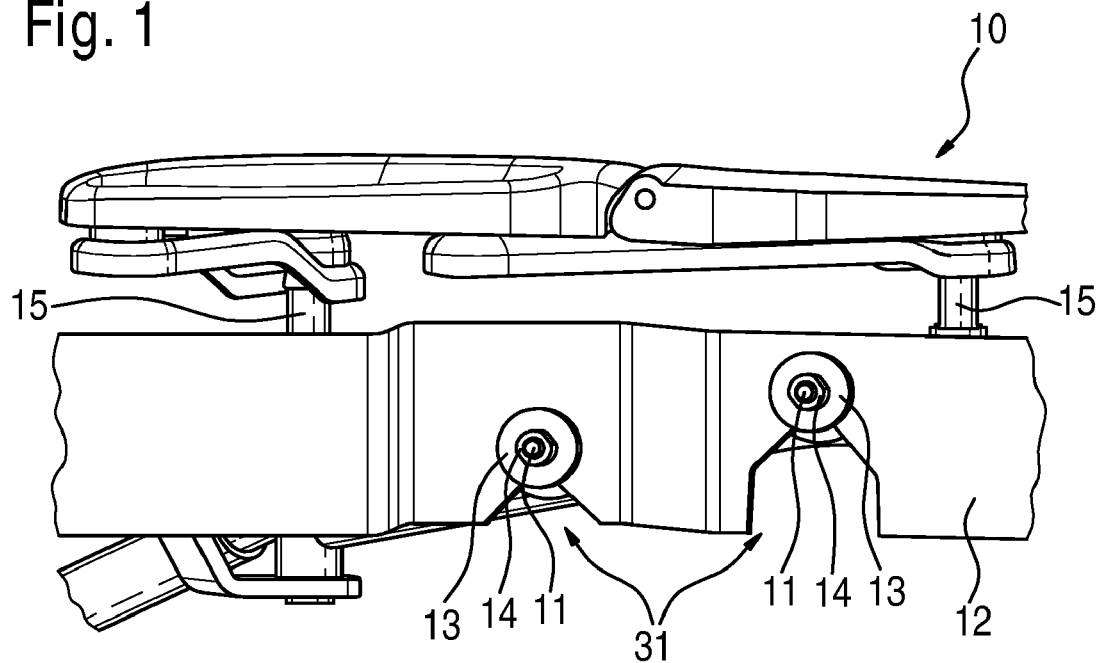
FIG. 1 is a front view onto the windscreen wiper device.
Figure 2:
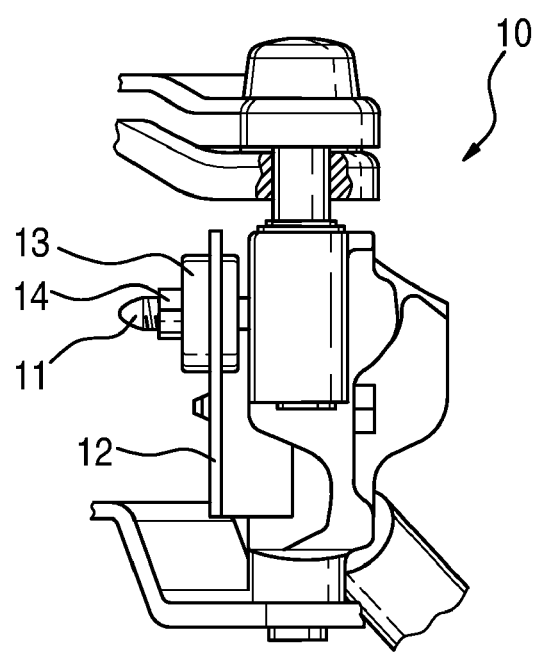
FIG. 2 is a side view onto the windscreen wiper device.
Figure 3A:
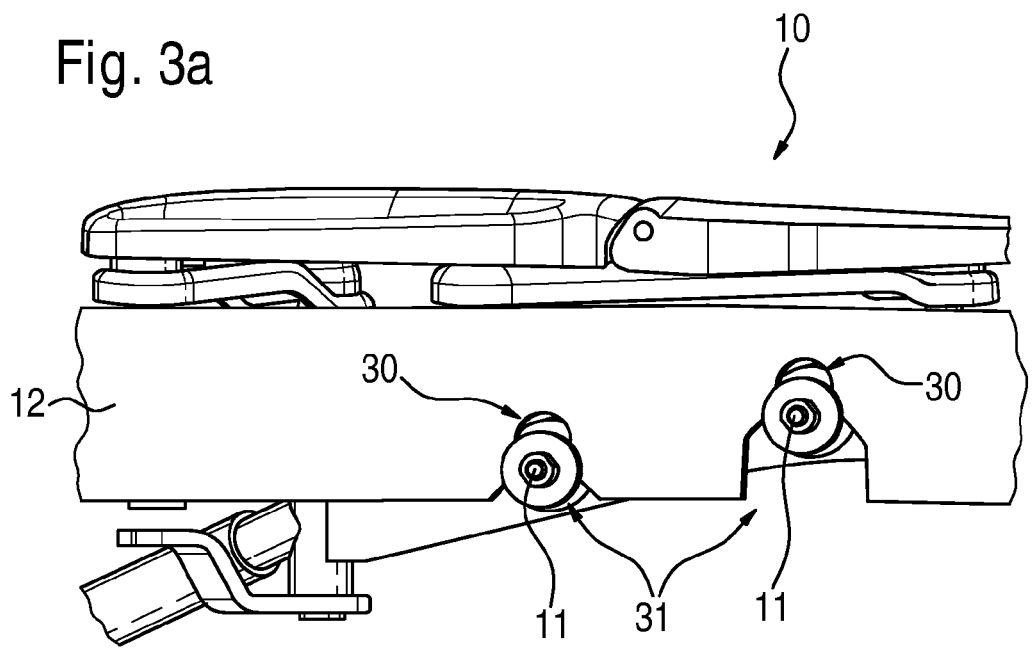
FIGS. 3a and 3b show the sequence of movement of the windscreen wiper device in the event of a collision with a pedestrian.

FIGS. 1 and 2 show a windscreen wiper device 10 which is fastened to a chassis 12 by screws 11. The screws 11 are inserted through rubber elements 13 (see also FIG. 4). Receiving openings 30 (see FIGS. 3a and 3b), in which the screws 11 are arranged together with the rubber elements 13, are provided in the chassis 12.

Nuts 14, into which the screws 11 can be screwed, are fastened to the rubber elements 13 (FIGS. 1 and 2).

Slots 31, along which the screws 11 are pressed out of the receiving openings 30 together with the rubber elements 13 when a pedestrian strikes the windscreen wiper device 10, are provided below the receiving openings 30.

When the pedestrian strikes the windscreen wiper device 10, the screws 11 and the rubber elements 13 therefore yield downwardly on impact along the slots 31. This lowers the windscreen wiper device 10 as a whole (see FIGS. 3a and 3b), significantly reducing the risk of injury to the pedestrian.

Figure 3B:
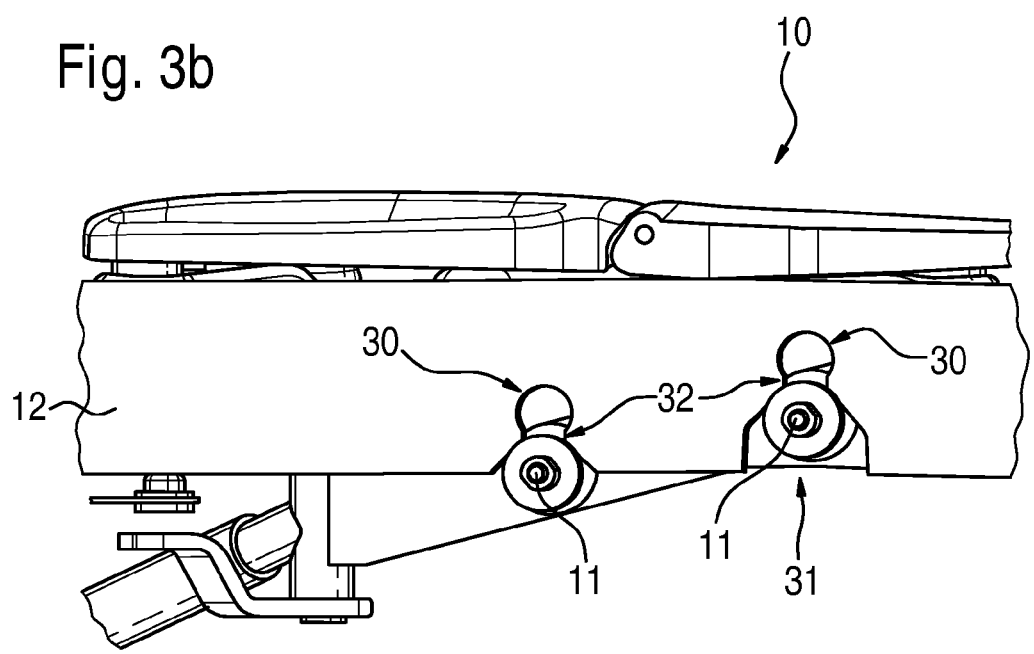
Figure 4:
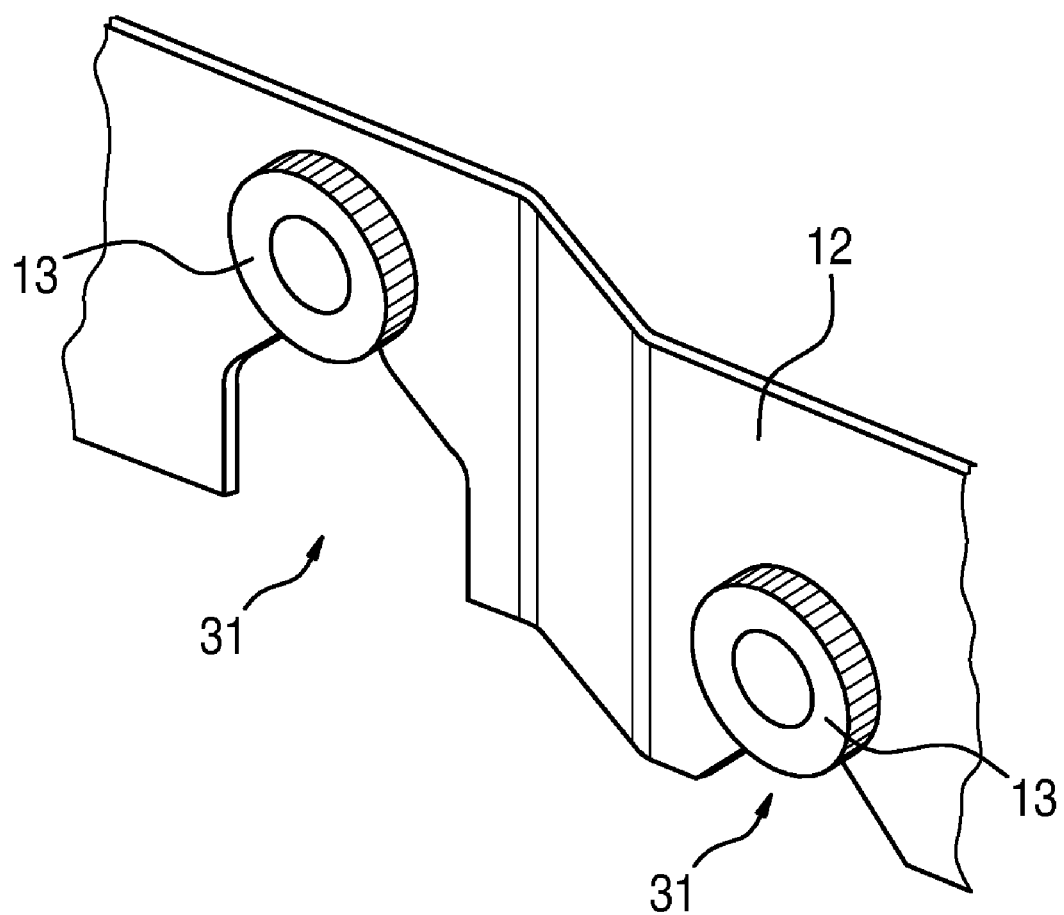
FIG. 4 is a detailed view onto the receiving openings.

The receiving openings 30 have a bottleneck 32 at the point of transition to the slots 31 (see FIG. 3b). The bottlenecks 32 ensure that the screws 11 and the rubber elements 13 are held securely in the receiving openings 30 in the event of shocks during travel.

Below the bottlenecks 32, the width of the slots increases, allowing the screws 11, the rubber elements 13 and the windscreen wiper device 10 connected thereto to be moved rapidly downward when the pedestrian strikes.

The slots 31 extend parallel to wiper shafts 15 (see FIG. 1). As a result, the screws 11 and the rubber elements 13 can be optimally pressed out of the receiving openings 30 when the pedestrian strikes the windscreen wiper device 10.

The invention claimed is:

1. A windscreen wiper device (10), which is screwed to a chassis (12), characterized in that receiving openings (30) in the chassis, which are provided to receive screws (11) connected to the wiper device (10), have a slot (31) at an edge of the receiving openings (30), each slot having a V-shaped configuration with diverging, generally linear sides, characterized in that the chassis has a wall having an open edge and defining the openings (30) and the slots (31), and characterized in that each slot (31) extends from the open edge of the wall to the associated opening (30).

2. The windscreen wiper device (10) as claimed in claim 1, characterized in that the slots (31) extend parallel to a wiper shaft (15).

3. The windscreen wiper device (10) as claimed in claim 1, characterized in that the slots (31) have a bottleneck (32) in a region of transition to the receiving openings (30).

4. The windscreen wiper device (10) as claimed in claim 3, characterized in that a width of the bottleneck is at most as great as diameters of the screws (11).

5. The windscreen wiper device (10) as claimed in claim 1, characterized in that the screws (11) are inserted through a rubber element (13).

6. The windscreen wiper device (10) as claimed in claim 1, characterized in that a force of detachment, with which the screws (11) can be pressed out of the receiving openings (30), is individually adjustable to a specific value.

7. The windscreen wiper device (10) as claimed in claim 1, characterized in that receiving openings for receiving the screws (11) are also provided in the windscreen wiper device.

8. A windscreen wiper device (10), which is screwed to a chassis (12), wherein receiving openings (30) in an open edge of a wall of the chassis (12), which receives screws (11) connected to the wiper device (10), has slots (31) at an edge of the receiving openings (30), and wherein each screw (11) is inserted through a rubber element (13) and threadedly engages a nut (14), the rubber elements (13) being between the nuts (14) and the chassis (12), characterized in that each nut (14) is fastened to each rubber element (13) independently of each screw.

9. The windscreen wiper device (10) as claimed in claim 8, characterized in that the slot has a V-shaped configuration with diverging, generally linear sides.

10. The windscreen wiper device (10) as claimed in claim 8, characterized in that the slot (31) has a bottleneck (32) in a region of transition to the receiving opening (30).

11. The windscreen wiper device (10) as claimed in claim 8, characterized in that the nut (14) is fastened to the rubber element (13) by one of vulcanizing, bonding and encapsulating.

12. A motor vehicle comprising a chassis (12) and a windscreen wiper device (10) secured to the chassis (12) with screws (11) connected to the wiper device (10), the chassis (12) having therein receiving openings (30) which receive the screws (11), and the chassis (12) having therein a slot (31) at an edge of each receiving opening (30), each slot having a V-shaped configuration with diverging, generally linear sides, characterized in that the chassis has a wall having an open edge and defining the openings (30) and the slots (31), and characterized in that each slot (31) extends from the open edge of the wall to the associated opening (30).

13. A motor vehicle as claimed in claim 12, characterized in that the slots (31) extend parallel to a wiper shaft (15).

14. A motor vehicle as claimed in claim 12, characterized in that the slots (31) have a bottleneck (32) in a region of transition to the receiving openings (30).

15. A motor vehicle as claimed in claim 14, characterized in that a width of the bottleneck is at most as great as diameters of the screws (11).

16. A motor vehicle as claimed in claim 12, characterized in that the screws (11) are inserted through a rubber element (13).

17. A motor vehicle as claimed in claim 12, characterized in that a force of detachment, with which the screws (11) can be pressed out of the receiving openings (30), is individually adjustable to a specific value.

18. A motor vehicle as claimed in claim 12, characterized in that receiving openings for receiving the screws (11) are also provided in the windscreen wiper device (10).

19. A motor vehicle comprising a chassis (12) and a windscreen wiper device (10) secured to the chassis (12) with screws (11) connected to the wiper device (10), the chassis (12) having therein receiving openings (30) in an open edge of a wall which receive the screws (11), and the chassis (12) having therein a slot (31) at an edge of each receiving opening (30), and wherein each screw is inserted through a rubber element (13) and threadedly engages a nut (14), the rubber element (13) being between the nut (14) and the chassis (12), characterized in that the nut (14) is fastened to the rubber element (13) independently of the screw.

20. A motor vehicle as claimed in claim 19, characterized in that the slot has a V-shaped configuration with diverging, generally linear sides.

21. A motor vehicle as claimed in claim 19, characterized in that the slot (31) has a bottleneck (32) in a region of transition to the receiving opening (30).

22. A motor vehicle as claimed in claim 19, characterized in that the nut (14) is fastened to the rubber element (13) by one of vulcanizing, bonding and encapsulating.

* * * * *